(12) United States Patent
Saito

(10) Patent No.: US 8,307,521 B2
(45) Date of Patent: Nov. 13, 2012

(54) METHOD FOR MANUFACTURING ACCELERATION SENSING UNIT

(75) Inventor: Yoshikuni Saito, Chigasaki (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/095,083

(22) Filed: Apr. 27, 2011

(65) Prior Publication Data

US 2011/0209330 A1   Sep. 1, 2011

Related U.S. Application Data

(62) Division of application No. 12/010,502, filed on Jan. 25, 2008, now Pat. No. 7,954,215.

(30) Foreign Application Priority Data

Mar. 19, 2007 (JP) .................................. 2007-070215
Dec. 3, 2007 (JP) .................................. 2007-312059

(51) Int. Cl.
*H04R 17/00* (2006.01)

(52) U.S. Cl. ............. 29/25.35; 29/417; 29/594; 29/827; 438/25; 438/50; 438/67; 438/461; 310/313 A; 310/313 R

(58) Field of Classification Search ................. 29/25.35, 29/417, 594, 827; 438/25, 50, 67, 461; 310/313 A, 310/313 R
See application file for complete search history.

(56) References Cited

U.S. PATENT DOCUMENTS

| 4,438,560 A | * | 3/1984 | Kisters | ............................. | 29/830 |
| 5,263,241 A | * | 11/1993 | Hart et al. | ........................ | 29/827 |
| 5,671,531 A | * | 9/1997 | Mugiya | ............................. | 29/840 |
| 5,760,290 A | * | 6/1998 | Ueyanagi | ........................ | 73/1.39 |

(Continued)

FOREIGN PATENT DOCUMENTS

JP   A-02-248866   10/1990

(Continued)

OTHER PUBLICATIONS

Dec. 20, 2011 Office Action issued in Japanese Patent Application No. 2007-312059 (with translation).

*Primary Examiner* — Derris Banks
*Assistant Examiner* — Azm Parvez
(74) *Attorney, Agent, or Firm* — Oliff & Berridge, PLC

(57) ABSTRACT

A method for manufacturing an acceleration sensing unit includes: providing an element support substrate in which a plurality of element supporting members is arranged so as to form a plane, each of the element supporting members being coupled to the other element supporting member through a supporting part and having a fixed part and a movable part that is supported by the fixed part through a beam, the beam having a flexibility with which the movable part is displaced along an acceleration detection axis direction when an acceleration is applied to the movable part; providing an stress sensing element substrate in which a plurality of stress sensing elements is arranged so as to form a plane, each of the stress sensing elements being coupled to the other stress sensing element through an element supporting part and having a stress sensing part and fixed ends that are formed so as to have a single body with the stress sensing part at both ends of the stress sensing part; disposing the stress sensing element substrate on the element support substrate such that the fixed ends of each stress sensing element are situated on the fixed part and the movable part; fixing the fixed ends onto the fixed part and the movable part, and dividing the element supporting part and the supporting part.

6 Claims, 11 Drawing Sheets

U.S. PATENT DOCUMENTS

| | | | |
|---|---|---|---|
| 5,920,113 A * | 7/1999 | Chee et al. | 257/666 |
| 6,003,369 A * | 12/1999 | Tola et al. | 73/493 |
| 7,009,116 B2 * | 3/2006 | Schmid et al. | 174/260 |
| 7,204,010 B2 * | 4/2007 | Germanton | 29/595 |
| 7,757,393 B2 * | 7/2010 | Ayazi et al. | 29/847 |
| 7,954,215 B2 * | 6/2011 | Saito | 29/25.35 |
| 2002/0170175 A1 * | 11/2002 | Aigner et al. | 29/884 |
| 2004/0159960 A1 * | 8/2004 | Fujiwara et al. | 257/783 |

FOREIGN PATENT DOCUMENTS

| | | |
|---|---|---|
| JP | A-6-88728 | 3/1994 |
| JP | A-2002-121037 | 4/2002 |
| JP | A-2004-120351 | 4/2004 |
| JP | A-2006-105948 | 4/2006 |

* cited by examiner

METHOD FOR MANUFACTURING ACCELERATION SENSING UNIT

This is a Division of application Ser. No. 12/010,502 filed Jan. 25, 2008. This application claims the benefit of Japanese Patent Application No. 2007-070215 filed Mar. 19, 2007 and No. 2007-312059 filed Dec. 3, 2007. The disclosures of the prior applications are hereby incorporated by reference herein in their entirety.

BACKGROUND OF THE INVENTION

1. Technical Field

The present invention relates to a method for manufacturing an acceleration sensing unit, particularly an acceleration sensing unit in which the same piezoelectric material is used for a stress sensing element and an element supporting member, the element supporting member supports the stress sensing element and deforms when stress is applied, and an etching method is used to form the acceleration sensing unit.

2. Related Art

Acceleration sensors have been widely used for cars, airplanes and rockets, abnormal vibration monitoring systems in plants and the like. JP-A-2-248866 is an example of related art. Referring to FIG. 14, the example discloses a beam structure in an acceleration sensor. In FIG. 14 which is the perspective view of the beam structure, the reference number 90 denotes a double-ended tuning-fork type quartz crystal resonator having two resonating beams 91, the reference number 92 denotes an adhesion part of the double-ended tuning-fork type quartz crystal resonator 90, and the reference number 100 denotes a beam that is formed of the quartz crystal whose cut angle is the same as that of the quartz crystal forming the double-tuning fork type quartz crystal resonator 90. A protrusion part 110 which is a part of the beam 100 where contacts with the adhesion part 92 of the double-ended tuning-fork type quartz crystal resonator 90 and has a thickness larger than other part of the beam 100 is provided. The protrusion part 110 is formed so as to have a single body with the beam 100. The protrusion part 110 and the adhesion part 92 of the double-tuning fork type quartz crystal resonator are adhesively bonded and fixed together with adhesive or the like. A weight 120 is further provided on a free end of the beam 100 and the other end opposing the weight 120 is fixed onto a base 130.

The base 130 of the acceleration sensor described with reference to FIG. 14 is fixed on a measured object. When acceleration is given in the direction pointed by the arrow in the drawing, the weight 120 bends the beam 100 and the frequency of the double-ended tuning-fork type quartz crystal resonator 90 which is fixed on the beam 100 is changed due to compression or tensile stress. In other words, this is a sensor measuring the acceleration velocity which can be derived from a variation in the frequency. When the protrusion part 110 is provided on the beam 100, the stress applied to the double-ended tuning-fork type quartz crystal resonator 90 is increased compared with the case where the protrusion part 110 is not provided. In this way the example concludes that it is possible to form a highly sensitive acceleration sensor without increasing the thickness of the beam 100 and without increasing the mass of the weight 120.

However the weight is situated at the end of the beam in the acceleration sensor according to the example, the beam deformation due to the acceleration concentrates around the fixed part and does not sufficiently works throughout the double-ended tuning-fork type quartz crystal resonator. Moreover, the stress caused by the acceleration tends to be dispersed because the thickness of the beam is uniform. Consequently the deformation is less likely to occur with a small acceleration and there is a problem that the measurement accuracy falls insufficient with the small acceleration. In addition, there is another problem that the mass productivity of the sensor is low because each component is individually fabricated according to the example.

SUMMARY

A method for manufacturing an acceleration sensing unit according to a first aspect of the invention includes:

a) providing an element support substrate in which a plurality of element supporting members is arranged so as to form a plane, each of the element supporting members being coupled to the other element supporting member through a supporting part and having a fixed part and a movable part that is supported by the fixed part through a beam, the beam having a flexibility with which the movable part is displaced along an acceleration detection axis direction when an acceleration is applied to the movable part;

b) providing an stress sensing element substrate in which a plurality of stress sensing elements is arranged so as to form a plane, each of the stress sensing elements being coupled to the other stress sensing element through an element supporting part and having a stress sensing part and fixed ends that are formed so as to have a single body with the stress sensing part at both ends of the stress sensing part;

c) disposing the stress sensing element substrate on the element support substrate such that the fixed ends of each stress sensing element are situated on the fixed part and the movable part;

d) fixing the fixed ends onto the fixed part and the movable part, and e) dividing the element supporting part and the supporting part.

According to the first aspect of the invention, it is possible to mass-produce the acceleration sensing unit with which a very small acceleration is detectable with a sufficient accuracy and which has fine temperature characteristic and mass productivity at a low production cost.

In this case, the stress sensing element may be placed over the supporting part in the step c).

The element supporting part and the supporting parts have sufficiently smaller widths compared to the size of the stress sensing element or the element supporting member according to the method. Thereby the element supporting part and the supporting part can be broken off without using a cutting apparatus such as a dicing machine and it is possible to diminish the amount of the parts left without being broken off. Consequently it is possible to manufacture a highly accurate acceleration sensing unit at a low production cost.

A method for manufacturing an acceleration sensing unit according to a second aspect of the invention includes:

a) providing an element support substrate in which a plurality of element supporting members is arranged so as to form a plane, each of the element supporting members being coupled to the other element supporting member through a supporting part and having a fixed part and a movable part that is supported by the fixed part through a beam, the beam having a flexibility with which the movable part is displaced along an acceleration detection axis direction when an acceleration is applied to the movable part;

b) providing at least a single weight part support substrate in which a plurality of weight parts is arranged so as to form a plane, each of the weight parts being coupled to the other weight part through a weight-part supporting part;

c) providing a stress sensing element substrate in which a plurality of stress sensing elements is arranged so as to form a plane, each of the stress sensing elements being coupled to the other stress sensing element through an element supporting part and having a stress sensing part and fixed ends that are formed so as to have a single body with the stress sensing part at both ends of the stress sensing part;

d) forming a substrate-layered structure by disposing the weight part support substrate on the element support substrate in order to couple at least the weight part with the movable part;

e) dividing the weight-part supporting part;

f) disposing the stress sensing element substrate onto the substrate-layered structure in order to couple the fixed ends of each stress sensing element with the substrate-layered structure; and g) dividing the element supporting part and the supporting part.

According to the second aspect, the weight-part supporting part, the element supporting part and the supporting parts have sufficiently smaller widths compared to the size of the weight part, the stress sensing element and the element supporting member. Thereby the weight-part supporting part, the element supporting part and the supporting part can be sequentially broken off and removed and it is possible to diminish the amount of the parts left without being broken off. Consequently it is possible to improve the accuracy in the size of the acceleration sensing unit. As a result it is possible to mass-produce a highly accurate acceleration sensing unit at a low production cost.

A method for manufacturing an acceleration sensing unit according to a third aspect of the invention includes:

a) providing an element support substrate in which a plurality of element supporting members is arranged so as to form a plane, each of the element supporting members being coupled to the other element supporting member through a supporting part and having a fixed part and a movable part that is supported by the fixed part through a beam, the beam having a flexibility with which the movable part is displaced along an acceleration detection axis direction when an acceleration is applied to the movable part;

b) providing a stress sensing element substrate in which a plurality of stress sensing elements is arranged so as to form a plane, each of the stress sensing elements being coupled to the other stress sensing element through an element supporting part and having a stress sensing part and fixed ends that are formed so as to have a single body with the stress sensing part at both ends of the stress sensing part;

c) providing at least a single weight part support substrate in which a plurality of weight parts is arranged so as to form a plane, each of the weight parts being coupled to the other weight part through a weight-part supporting part;

d) forming a substrate-layered structure by disposing the weight part support substrate on the element support substrate in order to couple at least the weight part with the movable part;

e) disposing the stress sensing element substrate on the substrate-layered structure in order to couple the fixed ends of each stress sensing element with the substrate-layered structure; and f) dividing the supporting part, the weight-part supporting part and the element supporting part.

According to the third aspect, the weight-part supporting part, the element supporting part and the supporting parts have sufficiently smaller widths compared to the size of the weight part, the stress sensing element and the element supporting member. Thereby the weight-part supporting part, the element supporting part and the supporting part can be broken off all together and removed. Thereby it is possible to mass-produce an acceleration sensing unit with a high dimension accuracy at a low production cost.

It is preferable that concave parts be formed in the supporting part, the element supporting part and the weight-part supporting part.

In this way the weight-part supporting part, the element supporting part and the supporting part can be easily broken off and removed because the break-off facilitation part or (a groove) is formed in the supporting part, the element supporting part and the weight-part supporting part. Moreover these supporting parts can be broke off substantially without leaving their butt-ends. Consequently the dimension accuracy of the acceleration sensing unit is improved and so is the measurement accuracy of the sensing unit.

In this case, the concave part provided in the supporting part may be formed along a thickness direction of the stress sensing element substrate, and the concave parts provided in the element supporting part and the weight-part supporting part may be formed so as to extend in a depth direction of the concave part provided in the supporting part.

In this way, the concave parts are formed along the directions in which the weight-part supporting part, the element supporting part and the supporting part are respectively broken off. Thereby each supporting part can be easily broken off from the concave part according to the sequence of the braking-off. Moreover these supporting parts can be broke off substantially without leaving their butt-ends. Consequently the dimension accuracy of the acceleration sensing unit is improved and so is the measurement accuracy of the sensing unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
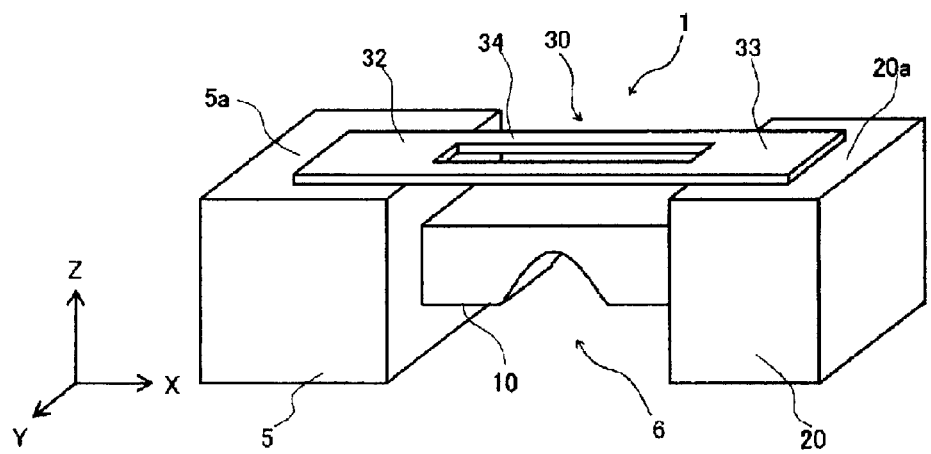
FIG. 1 is a schematic perspective view of an acceleration sensing unit according to a first embodiment of the invention showing its structure.

Embodiments of the invention will be described with reference to the accompanying drawings. FIG. 1 is a perspective view of an acceleration sensing unit 1 according to an embodiment of the invention showing its structure. The acceleration sensing unit 1 includes a fixed part 5 which will not be displaced by acceleration since it is fixedly supported by an unshown fixing part, a movable part 20 which is held movable with respect to the fixed part 5 by a beam 10, and a stress sensing element 30 having a stress sensing part 34 and fixed ends 32, 33 which are formed so as to form a single body with the stress sensing part 34 at its both ends. The beam 10 has a flexibility with which the movable part 20 is displaced in the direction along an acceleration detection axis (Z-axis direction) when an acceleration of the acceleration-detection-axis direction is applied to the movable part 20.

In the stress sensing element 30, the fixed end 32 is fixed on an upper face of the fixed part 5 and the fixed end 33 is fixed on an upper face of the movable part 20. These ends of the stress sensing element 30 are fixed (supported) with an adhesive. An element supporting member 6 having the fixed part 5, the movable part 20 and the beam 10 is fabricated from the same material as the stress sensing element 30. More preferably, the element supporting member 6 and the stress sensing element 30 are formed of the identical material (the same piezoelectric material).

Quartz crystal is appropriate as the piezoelectric material because of its quality stability, its fine frequency-temperature characteristics, its mass productivity and its low production cost. In other words, it is preferable that the element supporting member 6 and the stress sensing element 30 be fabricated from the same material (quartz crystal). Moreover, not only the same material in terms of constituent but also the identical quartz crystal material whose cut angles with respect to the crystalline axes are identical (the crystalline axes of the fixed ends 32,33 are aligned with the crystalline axes of the fixed part 5 and the movable part 20) can be adopted. When the cut angles are made the same, the liner expansion coefficient of the element supporting member 6 is squared with that of the stress sensing element 30. Accordingly it is possible to minimize the heat strain generated between the element supporting member 6 and the stress sensing element 30 even if an ambient temperature of the acceleration sensing unit 1 changes.

Consequently it is possible to form an acceleration sensing unit which is highly reliable against the ambient temperature change and has a fine acceleration sensing capability. The beam 10 that couples the fixed part 5 and the movable part 20 has a thickness which decreases gradually from the end part to the center part of the beam 10 and the minimum thickness lies in the center part. In other words, referring to FIG. 1, the center part of the lower face of the beam 10 is formed so as to have a semicircular shape or a parabolic shape in Y-axis direction and symmetrically with respect to Z-axis direction.

Figure 2:
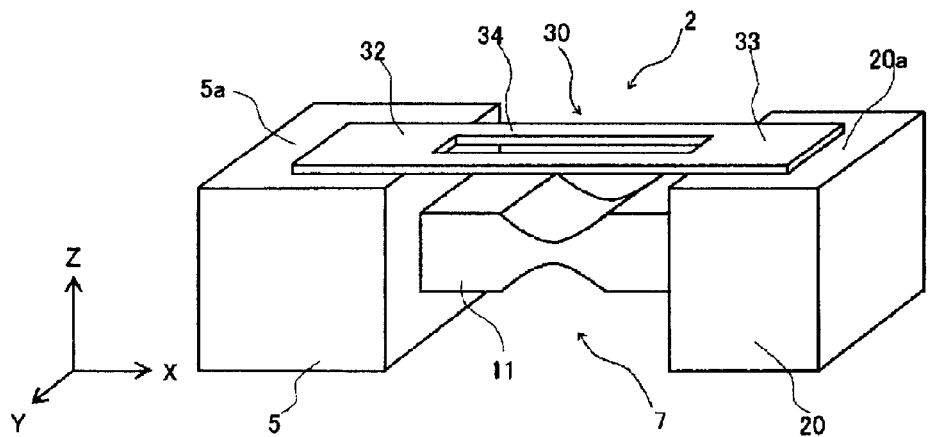
FIG. 2 is a schematic perspective view of an acceleration sensing unit according to a second embodiment of the invention showing its structure.

Referring now to FIG. 2, an acceleration sensing unit 2 has a beam 11 which is a modification of the beam 10 in the acceleration sensing unit 1 shown in FIG. 1. The beam 11 has a structure in which an equal deformation occurs in the beam 11 either when an acceleration (the acceleration of +□ where an acceleration in the direction pointed by the arrow of Z axis is defined as positive) is applied in + direction (the direction pointed by the arrow of Z axis) of the acceleration detection axis direction (the Z-axis direction) or when the acceleration of the same magnitude (the acceleration of -□ where an acceleration in the direction pointed by the arrow of Z axis is defined as positive) is applied in - direction (the opposite direction pointed by the arrow of Z axis). The beam 11 is formed such that the upper and lower faces at the center part have a hyperbolic curve in the Y-axis direction symmetrically with respect to the X and Z axis directions. Alternatively the beam 11 can be formed such that the thickness gradually decreases in a step-like pattern from the both ends to the center part.

When the beam is fabricated such that the thickness of the beam in the center part decreases in the semicircular pattern, the parabolic pattern or the hyperbolic curve pattern as described with the beams 10, 11 shown in FIG. 1 and FIG. 2, or such that the thickness of the beam gradually decreases in a step-like pattern from the both ends to the center part, the thinnest part of the beam situated in the center part warps and deforms such that the movable part 20 is moved in the acceleration detection axis direction. It is preferable that the lateral shape (the face viewed from the Y-axis direction) of the beam warp symmetrically with respect to the X and Z axis directions. More specifically, a beam having the similar shape as the beam 11 shown in FIG. 2 preferably warps equally despite the direction of the acceleration whether it is applied in the negative or positive direction (where the direction pointed by the arrow of the Z axis is the positive direction and the opposite is the negative direction).

The beams 10, 11 have the shape and the dimension such that displacement of the movable part 20 in the Y-axis direction which is orthogonal to the acceleration detection axis direction (the Z-axis direction) is hampered. The size of the beams 10, 11 in the depth direction (the Y-axis direction) is set to be larger than the width of the beams 10, 11 in the acceleration detection axis direction (the Z-axis direction) in order to prevent the movable part 20 from being displaced in other directions than the acceleration detection axis direction and in order to detect the acceleration component in the acceleration detection axis direction only.

Referring to FIG. 1 and FIG. 2, an upper face 5a of the fixed part 5 and an upper face 20a of the movable part 20 are placed parallel with the X-axis direction and at the same level in element supporting members 6, 7. The fixed end 32 of the stress sensing element 30 is adhered and fixed on the upper face 5a of the fixed part 5 with an adhesive, and the fixed end 33 is adhered and fixed on the upper face 20a of the movable part 20 with an adhesive. The stress sensing part 34 is formed such that it dose not reach the upper face 5a of the fixed part 5 and the upper face 20a of the movable part 20 so that it will not hamper the oscillation of the stress sensing element 30.

The stress sensing element 30 is a double-ended tuning-fork type quartz crystal resonator element that has the stress sensing part 34 made of a piezoelectric substrate and an excitation electrode formed in the oscillation area of the piezoelectric substrate as shown in FIG. 1 and FIG. 2. The stress sensing part 34 includes the two fixed ends 32, 33 and two resonating beams that couple the fixed ends 32, 33. The embodiment of the acceleration sensing unit 1 shown in FIG. 1 is an example adopting the double-ended tuning-fork type quartz crystal resonator element. The double-ended tuning-fork type quartz crystal resonator element has a fine sensitivity to the tensile and compression stress and has an excellent resolution so that it can detect a subtle change in acceleration. The frequency-temperature characteristic of the double-ended tuning-fork type quartz crystal resonator element is represented as a convex quadratic curve when it is plotted. Parameters are set such that the peak temperature of the quadratic curve becomes the ambient temperature (25° C.).

Resonance frequency "$f_F$" when an external force "F" is applied to the two resonating beams of the double-ended tuning-fork type quartz crystal resonator element is represented by the following formula (1):

$$f_F = f_O(1-(KL^2F)/(2EI))^{1/2} \quad (1)$$

where "$f_O$" is the resonance frequency of the double-ended tuning-fork type quartz crystal resonator element when no external force is applied, "K" is the constant (=0.0458) in a fundamental mode, "L" is the length of the resonating beam, "E" is a vertical elastic constant and "I" is a second moment of area. The formula (1) can be expressed as the following formula (2) since the second moment of area "I" is given by $dw^3/12$ where "d" is a thickness of the resonating beam and "w" is a width of the resonating beam.

$$f_F = f_O(1-S_F\sigma)^{1/2} \quad (2)$$

where "$S_F$" is a stress sensitivity given by $$S_F = 12(K/E)(L/w)^2 \quad (3)$$

and "σ" is the stress represented by $$\sigma = F/(2A) \quad (4)$$

Here, "A" is a cross-section area (=w·d) of the oscillating beam. When the force "F" acting on the double-ended tuning-fork type quartz crystal resonator element in the compression direction is defined as negative and the force "F" acting in the extension direction (tensile direction) is defined as positive, the correlation between the force "F" and the resonance frequency "$f_F$" is derived from the above formulas. The resonance frequency "$f_F$" decreases when the force "F" is the compression force whereas the resonance frequency "$f_F$" increases when the force "F" is the tensile (strain) force. The stress sensitivity "$S_F$" is proportional to the square of "L/w" of the oscillation beam. The relation between the stress and the peak temperature here is characterized such that the peak temperature shifts towards the low frequency side when the tensile stress is applied to the double-ended tuning-fork type quartz crystal resonator element, and the peak temperature shifts towards the high frequency side.

In addition to the double-ended tuning-fork type quartz crystal resonator element, any piezoelectric resonator elements can be used provided that their frequency changes according to the tensile and compression stress.

When an acceleration in the +Z axis direction (the direction pointed by the arrow) is applied to the acceleration sensing unit 1 shown in FIG. 1, the movable part 20 bends in the direction from the thinnest part of the beam 10 at the center to the acceleration detection axis direction (−Z axis direction in this embodiment) according to the law of inertia. The tensile stress is applied to the stress sensing element 30 and the resonance frequency of the stress sensing element 30 shifts to a higher frequency than the resonance frequency at the time of no stress. On the contrary, when an acceleration in the −Z axis direction (the opposite direction of the arrow) is applied, the movable part 20 bends in the direction from the thinnest part of the beam 10 at the center to the acceleration detection axis direction (+Z axis direction in this embodiment), the compression stress is applied to the stress sensing element 30 and the resonance frequency of the stress sensing element 30 shifts to a lower frequency than the resonance frequency at the time of no stress.

The action of the acceleration sensing unit 2 shown in FIG. 2 when the acceleration is given is the same as that of the above-mentioned acceleration sensing unit shown in FIG. 1.

Figure 3:
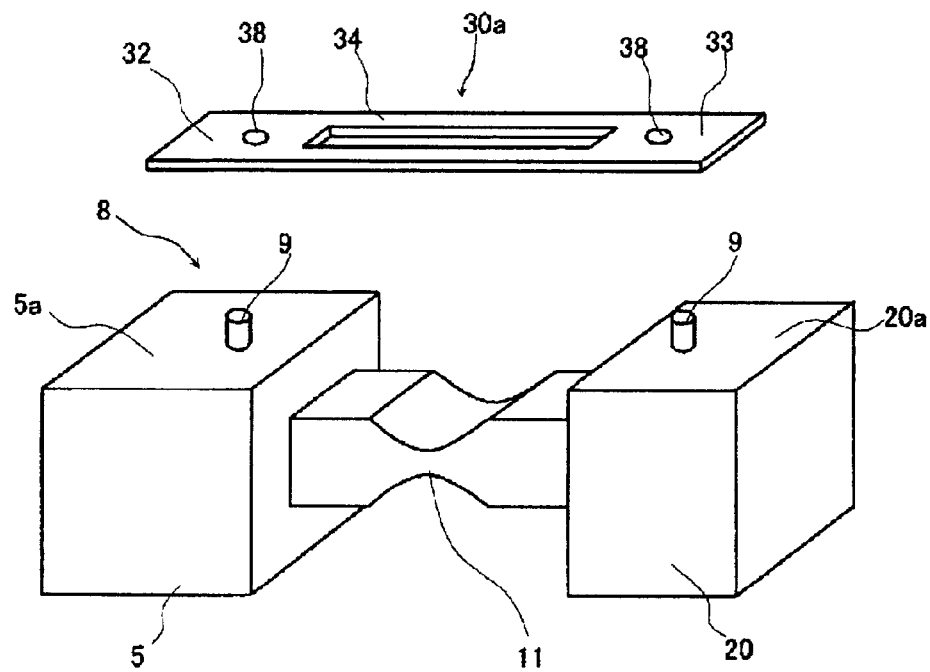
FIG. 3 is a schematic perspective view of an acceleration sensing unit according to a third embodiment showing its structure.

FIG. 3 is a perspective view of an element supporting member 8 and a stress sensing element 30a when they are separated each other. The element supporting member 8 includes the fixed part 5 whose upper face 5a has a protrusion 9, the movable part 20 whose upper face 20a has the protrusion 9, and the beam 11 that connects the fixed part 5 and the movable part 20. The stress sensing element 30a includes the stress sensing part 34 made of a piezoelectric substrate and an excitation electrode formed in the oscillation area of the piezoelectric substrate. The stress sensing part 34 includes the two fixed ends 32, 33 and two resonating beams that couple the fixed ends 32, 33. An opening 38 that fits the protrusion 9 provided on the upper face of the fixed part 5 and the movable part 20 is formed respectively in the fixed ends 32, 33. An adhesive is applied around the protrusion 9 of the element supporting member 8. The protrusion 9 is then engaged in the opening 38 of the stress sensing element 30a. At the same time, the fixed ends 32, 33 are adhered to the fixed part 5 and the movable part 20. With such structure, the stress sensing element 30a can be firmly fixed to the element supporting member 8 through the protrusion 9. Thereby even if a soft adhesive such as silicon adhesive is applied in order to reduce the contraction stress (adhesion stress) of the adhesive adhering the fixed ends 32, 33 for example, it is possible to transmit the tensile and compression stress of the element supporting member 8 in the X-axis direction to the stress sensing element 30a efficiently through the above-mentioned connection structure of the protrusion 9 and the opening 38.

Moreover, the protrusion 9 temporarily fixes the stress sensing element 30a to the element supporting member 8 until the adhesive becomes hardened. This function of the protrusion increase the accuracy of the mounting position of the stress sensing element 30a and helps to make the assembling of the acceleration sensing unit easier.

Figure 4:
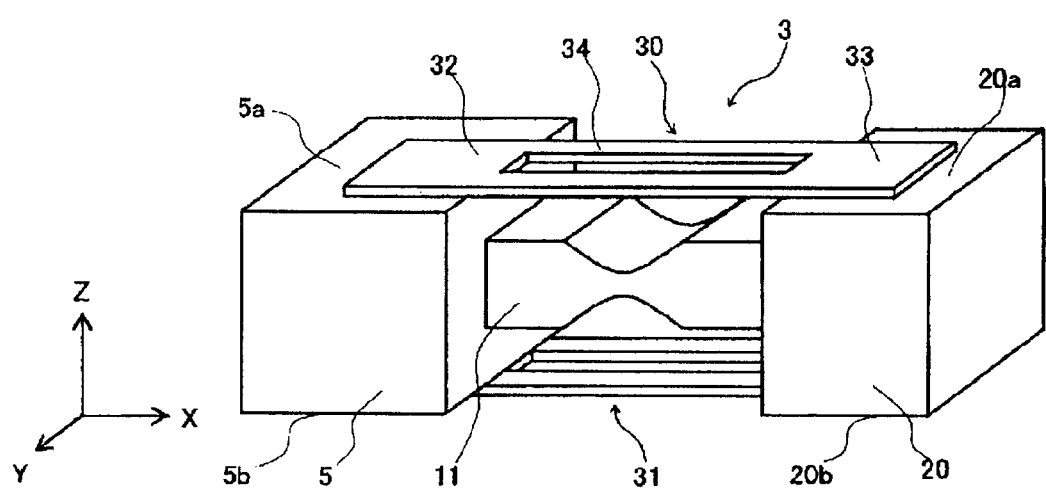
FIG. 4 is a schematic perspective view of an acceleration sensing unit according to a fourth embodiment showing its structure.

FIG. 4 is a perspective view of a differential type acceleration sensing unit 3 showing its structure. The differential type acceleration sensing unit 3 includes the fixed part 5 which will not be displaced by acceleration, the movable part 20 which is held movable with respect to the fixed part 5 by the beam 11, and the first stress sensing element 30 and the second sensing element 31 that have the stress sensing part and the fixed ends which are formed so as to form a single body with the stress sensing part at its both ends. The beam 11 has a flexibility with which the movable part 20 is displaced in the direction along the acceleration detection-axis direction (the Z-axis direction) when an acceleration is applied to the movable part 20. The first stress sensing element 30 is held and fixed by the fixed ends 32, 33 on the upper face 5a of the fixed part 5 and on the upper face 20a of the movable part 20. The second stress sensing element 31 is held and fixed by fixed ends 35, 36 (unshown in the drawing) on a lower face 5b of the fixed part 5 and on a lower face 20b of the movable part 20. The element supporting member 7 including the fixed part 5, the movable part 20 and the beam 11 is fabricated from the same material as that of the first and second stress sensing elements 30, 31.

Figure 5:
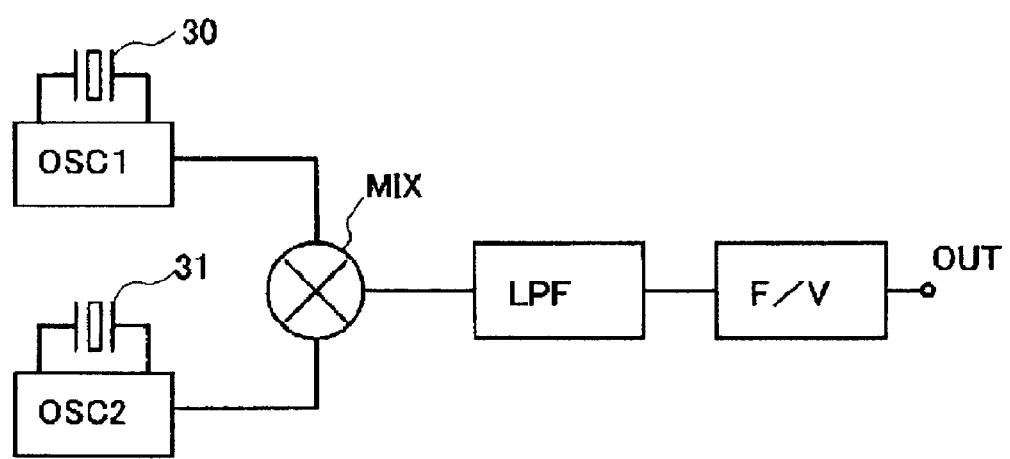
FIG. 5 depicts an acceleration measuring circuit including an oscillation circuit, a mixer, a low-pass filter and a frequency-voltage converter.

When an acceleration sensor is configured by using the acceleration sensing unit 3 shown in FIG. 4, it is required to provide a circuit having first and second oscillation circuits OSC1, OSC2, a mixer MIX, a low-pass filter LPF and a frequency-voltage converter F/V as shown in FIG. 5. Here, oscillation frequency of the first and second oscillation circuits OSC1, OSC2 when an acceleration is applied are denoted as "f1", "f2" respectively. If the frequencies "f1", "f2" are mixed by the mixer, frequencies such as (f2−f1) and (f1+f2) can be obtained. When the frequency further passes through the low-pass filter LPS, only the difference frequency (f2−f1) can be obtained. The difference frequency (f2−f1) is converted into voltage by the frequency-voltage converter F/V and outputted as an output OUT, and the output voltage is changed into acceleration by an external device.

For example, the resonance frequency F1, F2 of the first and second stress sensing elements 30, 31 are both set in 40 kHz. The case where the resonance frequency F1 is changed to f1=38 kHz and the resonance frequency F2 is changed to f2=42 kHz when an acceleration (the acceleration of −□ where acceleration in the direction pointed by the arrow of Z axis is defined as positive) in the −Z axis direction (the opposite direction to the one which the arrow of the Z axis points) is applied is now considered. An absolute value of the difference frequency |f2−f1| in this case is 4 kHz. Whereas the resonance frequency F1 is changed to f1=42 kHz and the resonance frequency F2 is changed to f2=38 kHz when the acceleration of the same magnitude (the acceleration of +□) but in the +Z axis direction (the direction pointed by the arrow of Z axis) is applied. An absolute value of the difference frequency |f2−f1| in this case is 4 kHz. In this way, when the differential type acceleration sensing unit is configured by using the two stress sensing elements 30, 31, the difference frequency is doubled compared with the case of the single stress sensing element whose frequency change is 2 kHz. Consequently the acceleration detection sensitivity is doubled.

Meanwhile, acceleration is vector and has both size and direction. In order to detect the direction of the vector, the difference between the oscillation frequencies of the first and second stress sensing elements 30, 31 at the time of no stress is determined in advance. For example, the resonance frequencies F1, F2 of the first and second stress sensing elements 30, 31 when there is no stress applied are set at 40 kHz, 50 kHz respectively. The resonance frequency F1 is changed to for example f1=38 kHz and the resonance frequency F2 is changed to for example f2=52 kHz when an acceleration (the acceleration of −□ where acceleration in the direction pointed by the arrow of Z axis is defined as positive) in the −Z axis direction (the opposite direction to the one which the arrow of the Z axis points) is applied. The difference frequency (f2−f1) in this case is 14 kHz. Whereas the resonance frequency F1 is changed to f1=42 kHz and the resonance frequency F2 is changed to f2=48 kHz when the acceleration of the same magnitude (the acceleration of +□) but in the +Z axis direction (the direction pointed by the arrow of Z axis) is applied. The difference frequency (f2−f1) in this case is 6 kHz. In this way the difference frequency is changed from 14 kHz when the acceleration of −□ is applied to 6 kHz when the acceleration of +□ is applied with the frequency of 10 kHz as the center. The frequency of 10 kHz is the difference between the resonance frequency of the first stress sensing element 30 and the resonance frequency of the second stress sensing element 31 at the time of no stress. Thereby it is possible to detect the direction of the acceleration.

Moreover, according to the embodiment, the two stress sensing elements are used to form the differential type acceleration sensing unit. Where the two stress sensing elements 30, 31 have the same sensitivity, the frequency changes of the two sensing elements in other axes such as Y-axis become same and the frequency change component can be canceled by using the difference between the two frequencies. Furthermore, it is possible to change the acceleration detection sensitivity of the acceleration sensing unit 3 by changing the mass of the movable part.

Figure 6A:
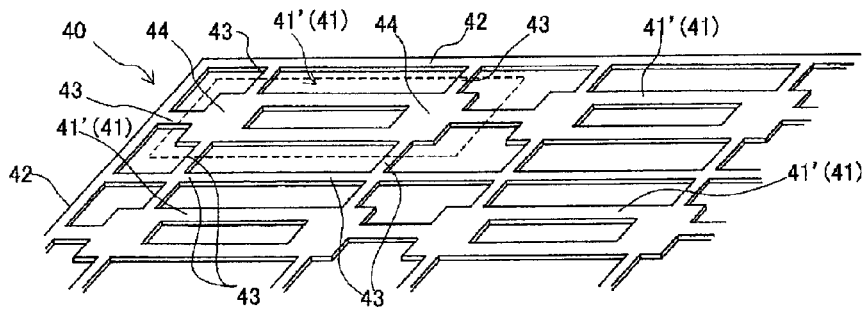
FIG. 6A shows a stress sensing element substrate.
Figure 6B:
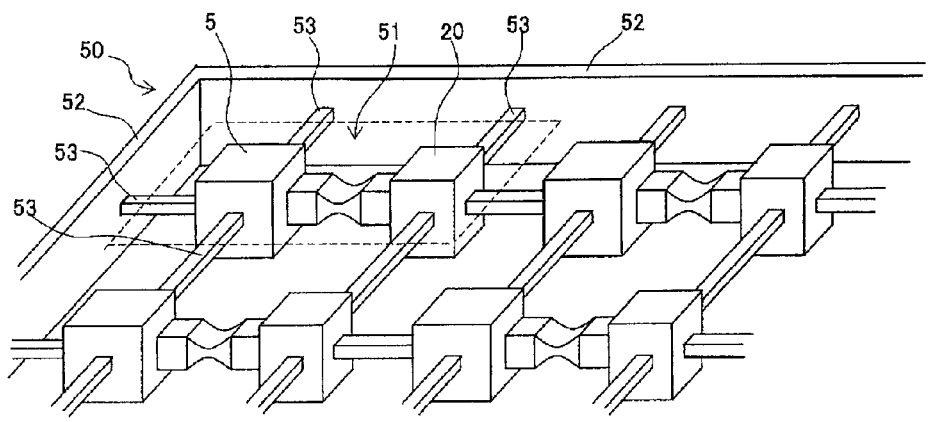
FIG. 6B depicts an element support substrate and FIG. 6C illustrates a substrate-layered structure in which the stress sensing element substrate is placed on the element support substrate.
Figure 6C:
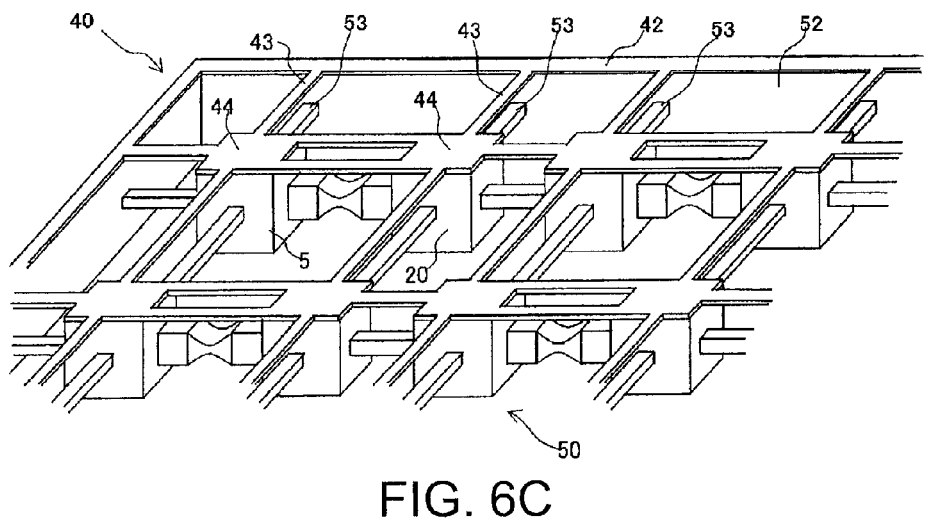

FIGS. 6A through 6C are perspective views of the acceleration sensing unit showing a manufacturing method thereof according to an embodiment of the invention. Referring to FIG. 2, the acceleration sensing unit for example has the element supporting member 7 and the stress sensing element 30. The element supporting member 7 includes the fixed part 5 which does not be displaced by acceleration and the movable part 20 which is held by the fixed part 5 through the beam 11. The stress sensing element 30 includes the stress sensing part 34 and the fixed ends 32, 33 which are formed so as to form a single body with the stress sensing part 34 at the both ends. The beam 11 has a flexibility with which the movable part 20 is displaced in the direction along the acceleration detection axis direction (the Z-axis direction) when an acceleration is applied to the movable part 20. In the stress sensing element 30, the fixed ends 32, 33 are supported by the fixed part 5 and the movable part 20 respectively. The embodiment is a method for manufacturing such acceleration sensing unit. The method includes a step of providing a stress sensing element substrate 40 that has a plurality of stress sensing elements 41' as shown in FIG. 6A, and a step of providing an element support substrate 50 that has a plurality of element supporting members 51 as shown in FIG. 6B. The stress sensing elements 41' are coupled each other through supporting parts 43 and arranged so as to form a plane. The element supporting members 51 are coupled each other through supporting parts 53 and arranged so as to form a plane. In addition, there is a step of applying an adhesive onto the faces of each fixed part 5 and each movable part 20 in order to couple the fixed ends 44 of the stress sensing element 41' with the fixed part 5 and the movable part 20 in the element supporting member 51. The element support substrate 50 is disposed under the stress sensing element substrate 40 as shown in FIG. 6C. Furthermore, there is a step of dividing the element supporting parts 43 and the supporting part 53.

A method for manufacturing the stress sensing element substrate 40 is now described. A quartz crystal thin substrate (Z plate) having a predetermined thickness is firstly provided. A metal thin film is formed on the quartz crystal thin substrate by deposition or sputtering, the quartz crystal thin substrate is then etched by using commonly-known photolithography technique and etching technique so as to obtain the stress sensing element substrate 40 in which a double-ended tuning-fork quartz crystal plate 41 is arranged in matrix. The double-ended tuning-fork quartz crystal plate 41 (the stress sensing element 41' is the double-ended tuning-fork quartz crystal plate 41 on which unshown excitation electrode and electrode terminal are formed) is shown in the area enclosed by dotted line in FIG. 6A. The double-ended tuning-fork quartz crystal plate 41 is held by a rectangular-loop shaped frame 42 and through more than one element supporting part 43. An unshown metal mask is set on the stress sensing element substrate 40 and the substrate is put in a deposition apparatus or the like. The excitation electrode, electrode terminal and the like are formed on the double-ended tuning-fork quartz crystal plate 41 in the deposition apparatus, and the stress sensing element substrate 40 is fabricated.

Figure 7:
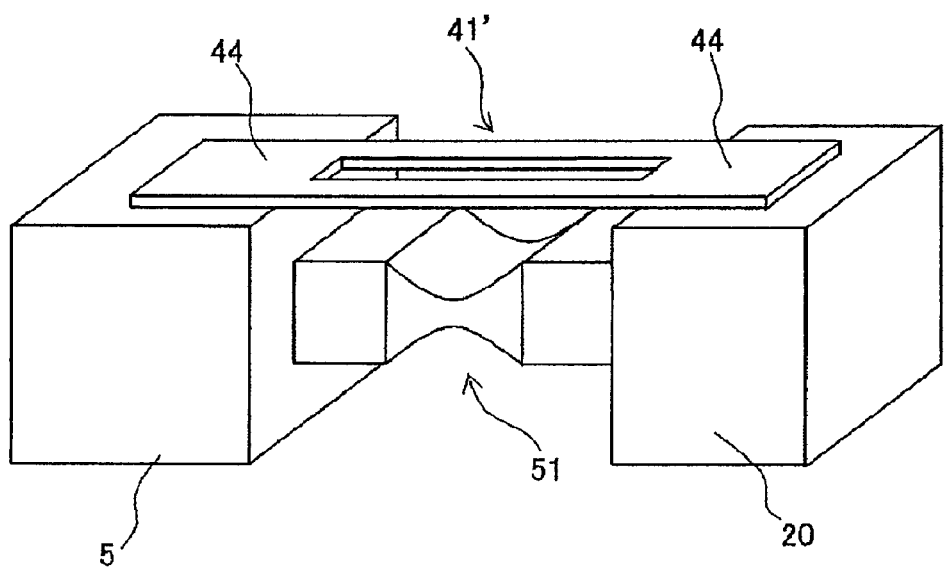
FIG. 7 is a schematic perspective view of an acceleration sensing unit showing its structure.

A method for manufacturing the element support substrate 50 is now described. A quartz crystal substrate (Z plate) having a predetermined thickness is provided and the quartz crystal substrate is processed by using the photolithography technique and the etching technique so as to fabricate the element support substrate 50 in which the element supporting member 51 shown in the area enclosed by dotted line in FIG. 6B is arranged in matrix. The element supporting member 51 includes the fixed part 5, the beam 11 and the movable part 20. The element supporting member 51 is held by a rectangular-loop shaped frame 52 through more than one supporting part 53. An adhesive is applied on the fixed parts 5 and the movable parts 20 of the element supporting members 51 in the element support substrate 50. The stress sensing element substrate 40 on which electrodes and the like are formed is then aligned and placed onto the element support substrate 50 as shown in FIG. 6C. Subsequently, the jointed substrates are heated and dried. The substrate is diced by cutting the supporting parts 43, 53 with a dicing saw or the like and the acceleration sensing unit shown in FIG. 7 can be obtained. The stress sensing element substrate 40 and the element support substrate 50 can be adhered together by other methods such as bonding with melted glass which is melted at a high temperature, bonding with gold-tin and anodic bonding.

If the mass of the movable part 20 is not sufficient and the acceleration detection sensitivity is too small, the sensitivity can be improved by adding substantially the same weight onto the upper face and the lower face of the movable part 20.

When the acceleration sensing unit is mass-produced according to the above-described method, it is possible to obtain the acceleration sensing units among which the quality difference in the acceleration detection sensitivity is small and it is possible to manufacture the acceleration sensing units in large numbers efficiently.

The method for manufacturing the acceleration sensing unit described above with reference to FIG. 6 can also be applied to the acceleration sensing unit 3 shown in FIG. 4. More specifically the element support substrate 50 is sandwiched by two stress sensing element substrates 40. An adhesive is applied onto the upper and lower faces of the fixed parts 5 and the movable parts 20 of the element supporting members 51 in the element support substrate 50. The stress sensing element substrates 40 on which electrodes and the like are formed are then aligned and placed onto the element support substrate 50 such that the element support substrate 50 is interposed between the stress sensing element substrates 40. Subsequently, the jointed substrates are heated and dried. The substrate is diced by cutting the supporting parts 43, 53 with a dicing saw or the like and the acceleration sensing unit 3 can be obtained.

Moreover, the method for manufacturing the acceleration sensing unit described above with reference to FIG. 6 can also be applied to the acceleration sensing unit shown in FIG. 3. More specifically, the element support substrate 50 has the element supporting member 51 on which the protrusion 9 is formed, and the stress sensing element substrate 40 has the double-ended tuning-fork quartz crystal plate 41 in which the opening 38 is formed.

Referring to FIG. 6, the width of the element supporting part 43 is smaller than the width of the fixed end of the stress sensing element 41'. The width of the supporting part 53 is much smaller than that of the fixed part and the movable part. It is generally impossible to cut the element supporting part 43 and the supporting part 53 without leaving a part of them to the fixed end, the movable part and the fixed part if the element supporting part 43 and the supporting part 53 are tried to be cut without damaging the fixed end, the movable part and the fixed part.

However, according to the embodiment, the element supporting part 43 and the supporting part 53 are thin and small so that it is possible to diminish the amount of the parts of the supporting parts which are left without being cut out in the acceleration sensing unit. This means that the weight adjustment of the movable part 20 will not be largely affected by the left over of the supporting parts so that it is possible to obtain the acceleration sensing units among which the quality variation in the acceleration detection sensitivity is small and it is possible to efficiently produce such acceleration sensing units in the large numbers.

According to the above-described method for manufacturing the acceleration sensing unit, the element supporting part 43 of the stress sensing element substrate 40 and the supporting part 53 of the element support substrate 50 are cut by using the dicing saw or the like. In this case, the butt-ends of the element supporting part 43 and the supporting part 53 are left on the fixed part of the stress sensing element 41' and the movable part 20 of the element supporting member 51. Given this factor, a second method for manufacturing the acceleration sensing unit with which the butt-ends of the element supporting part 43 and the supporting part 53 are not left on the fixed part of the stress sensing element 41' and the movable part 20 of the element supporting member 51 will be now described.

FIGS. 8 through 11 are explanatory drawings for describing the second method for manufacturing the acceleration sensing unit according to an embodiment of the invention. Here, the acceleration sensing unit has the same structure as that of the first method therefore the description of the structure will be hereunder omitted.

Figure 8A:
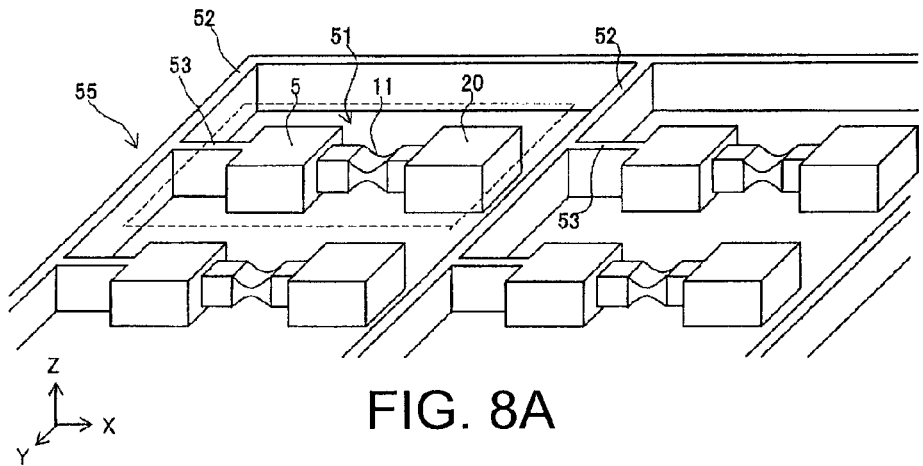
FIG. 8A depicts an element support substrate.
Figure 8B:
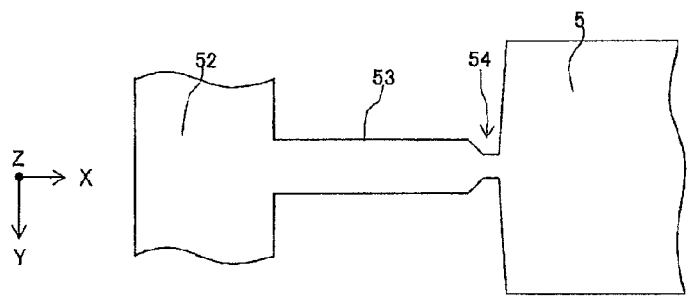
FIG. 8B is an enlarged view of the main part of a supporting part.
Figure 8C:
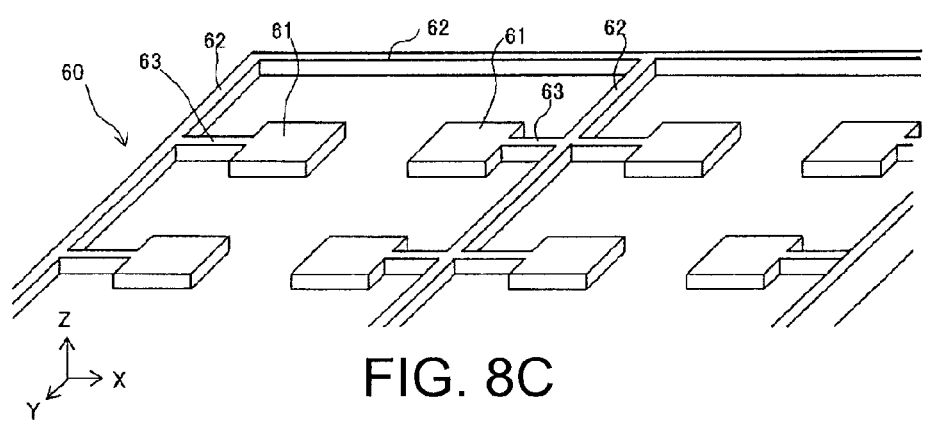
FIG. 8C illustrates an weight part support substrate.
Figure 8D:
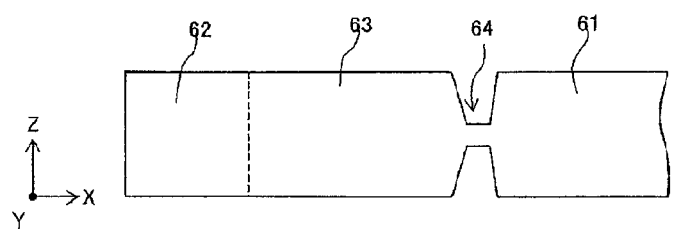
FIG. 8D is an enlarged view of the main part of a weight part supporting part.
Figure 9A:
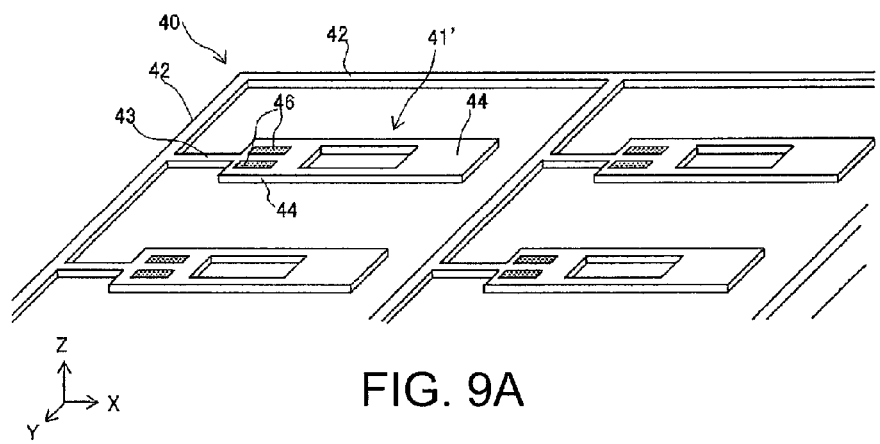
FIG. 9A depicts a stress sensing element substrate and FIG. 9B is an enlarged view of the main part of an element supporting part.

The second method for manufacturing the acceleration sensing unit according to the embodiment includes a step of providing an element support substrate 55 that has a plurality of the element supporting members 51 as shown in FIG. 8A and a step of providing at least one weight part support substrate 60 that has a plurality of weight-part supporting parts 63 as shown in FIG. 8C. Referring to FIG. 8A, the element support substrate 55 includes the frame 52, a plurality of the supporting parts 53 formed on the frame 52, and the plurality of the element supporting members 51 each of which is individually supported by the respective supporting part 53. Referring to FIG. 8C, the weight part support substrate 60 includes a frame 62, the plurality of the weight-part supporting parts 63 each of which is provided on the frame 62 so as to be situated at the same position as the corresponding supporting part 53 of the element support substrate 55, and weight parts 61 each of which is individually supported by the corresponding weight part supporting part 63. The second manufacturing method further includes a step of providing the stress sensing element substrate 40 that has a plurality of the stress sensing elements 41'. Referring to FIG. 9A, the stress sensing element substrate 40 includes the frame 42, a plurality of the element supporting parts 43 each of which is provided on the frame 42 so as to be situated at the same position as the corresponding supporting part 53 of the element support substrate 55, and the plurality of the stress sensing elements 41' each of which is individually supported by the corresponding element supporting part 43.

Figure 9B:
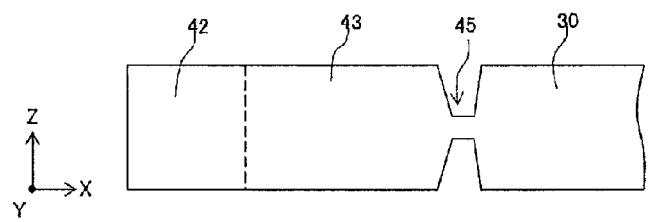

The element support substrate 55, the weight part support substrate 60 and the stress sensing element substrate 40 are fabricated from quartz crystal plates (Z plates) having predetermined thicknesses and by processing the plates into desired shapes with the above-described photolithography technique and etching technique. Referring to FIG. 8B which is an enlarged plan view (view from the Z-axis direction) of main parts, each supporting part 53 in the element support substrate 55, a break-off facilitation part or a groove (concave part) 54 is formed along the Z-axis direction at the position where the supporting part 53 is jointed with the fixed part 5. Thereby the supporting part 53 is strong against a force applied in the Z-axis direction but weak against a force in the Y-axis direction and can be broken or cut off easily by applying a force in the Y-axis direction. Moreover, Referring to FIG. 8D which is an enlarged plan view (view from the Y-axis direction) of main parts, each weight part supporting part 63 in the weight part support substrate 60, a break-off facilitation part or a groove (concave part) 64 is formed along the Y-axis direction (in the depth direction of the concave part 54) at the position where the weight part supporting part 63 meets with the weight part 61. Thereby the weight part supporting part 63 can be broken or cut off easily by applying a force in the Z-axis direction. Referring to FIG. 9B which is an enlarged plan view (view from the Y-axis direction) of main parts, in the same manner, each element supporting part 43 in the stress sensing element substrate 40, a break-off facilitation part or a groove (concave part) 45 is formed along the Y-axis direction (in the depth direction of the concave part 54) at the position where the element supporting part 43 meets with fixed end 44 of the stress sensing element 41'. Thereby the element supporting part 43 can be broken or cut off easily by applying a force in the Z-axis direction. Meanwhile, the stress sensing element substrate 40 shown in FIG. 9A is an example in which an electrode (unshown in the drawing), an electrode 46 and the like have been formed on the substrate with a vacuum apparatus by using an unshown mask.

Figure 10:
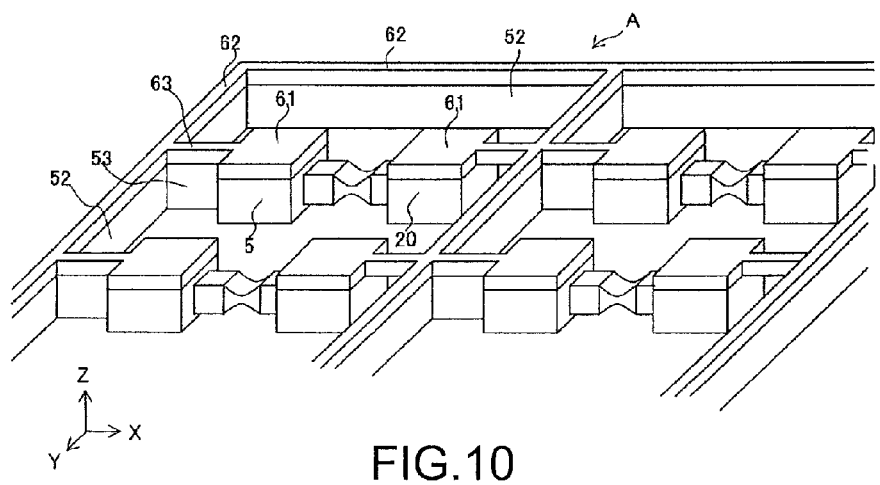
FIG. 10 illustrates a substrate-layered structure of the stress sensing element substrate and the weight part support substrate.
Figure 11A:
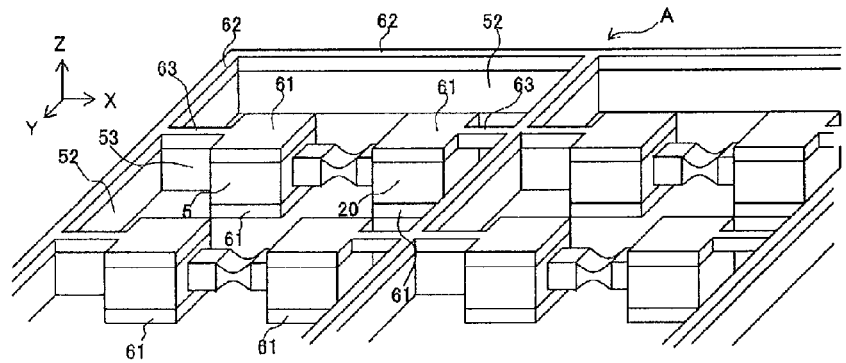
FIG. 11A illustrates a substrate-layered structure of the stress sensing element substrate and the weight part support substrates.
Figure 11B:
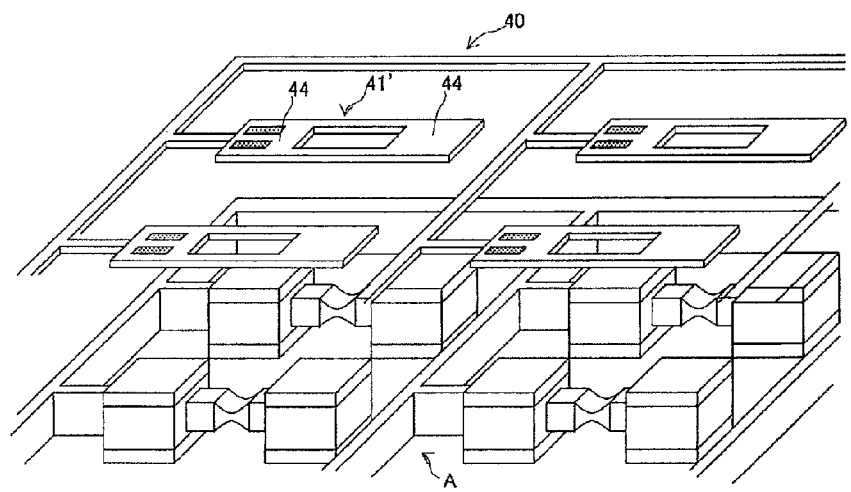
FIG. 11B depicts how the stress sensing element substrate is placed on the substrate-layered structure.
Figure 11C:
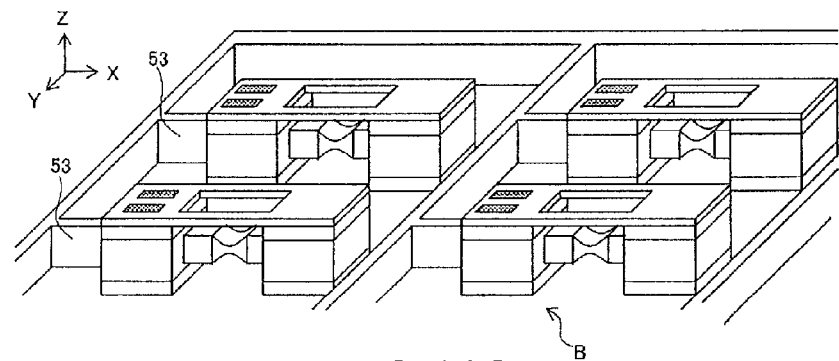
FIG. 11C shows a step of disconnection by breaking off.

Subsequently, an adhesive is applied onto the faces of the fixed parts 5 and the movable parts 20 of the element supporting members 51 in order to couple the weight part 61 with at least one face of the corresponding fixed part 5 and the movable part 20. Referring to FIG. 10 and FIG. 11, the element support substrate 55 is then disposed on the weight part support substrate 60 such that each supporting part 53 overlaps with the corresponding weight part supporting part 63, and a substrate-layered structure A is formed. After the adhesive got hardened, each weight part supporting part 63 is broken off and removed from the substrate-layered structure A. FIG. 11A is a perspective view showing an example where the weight parts 61 are adhered on the upper and lower faces of the fixed parts 5 and the movable parts 20. An adhesive is subsequently applied onto a face of each weight part 61 in the substrate-layered structure A in order to couple the fixed end 44 of the stress sensing element 41' with the face of the corresponding weight part 61. Referring to FIG. 11B, the stress sensing element substrate 40 is disposed on the substrate-layered structure A such that each supporting part 53 overlaps with the corresponding element supporting part 43, and a substrate-layered structure B is formed. Referring to FIG. 11C, after the adhesive got hardened, each element supporting part 43 of the stress sensing element substrate 40 and each supporting part 53 of the element support substrate 55 are broken off from the substrate-layered structure B. In this way, the acceleration sensing units are manufactured according to the second method. Alternatively, the weight part 61 can be at least coupled to the movable part 20.

Though the above-described method, the weight part 61 is provided onto both the upper and lower faces of each fixed part 5 and each movable part 20 as shown in FIGS. 11A through 11C, the acceleration sensing unit can be formed by placing the weight part 61 only on one face of each fixed part 5 and each movable part 20. In this case, the stress sensing element substrate 40 can be provided either on the side of the fixed parts 5 and the movable parts 20 or on the side of the weight parts 61 that are disposed on the fixed parts 5 and the movable parts 20.

A feature of the second method for manufacturing the acceleration sensing unit is that the supporting part 53 in the element support substrate 55, the weight part supporting part 63 in the weight part support substrate 60, and the element supporting part 43 in the stress sensing element substrate 40 are formed to have widths much smaller than the element supporting member 51, the weight part 61 and the fixed end 44 of the stress sensing element 41'. Thereby the supporting part 53, the weight part supporting part 63 and the element supporting part 43 can be easily broken off and cut out because the grooves (concave parts) 54, 64, 45 are respectively provided. Furthermore, it is possible to make butt-ends of the supporting part 53, the weight part supporting part 63 and the element supporting part 43 very small because of the grooves (concave parts) 54, 64, 45. Thereby there is an advantage that highly-accurate acceleration sensing units can be produced in large volume.

A third method for manufacturing the acceleration sensing unit according to an embodiment of the invention is now described. Here, the acceleration sensing unit has the same structure as that of the first method therefore the description of the structure will be hereunder omitted. In the third method, a step of providing the element support substrate 55, a step of providing at least one weight part support substrate 60, a step of providing the stress sensing element substrate 40, a step of forming the substrate-layered structure by placing the element support substrate 55 on the weight part support substrate 60, and a step of placing the stress sensing element substrate 40 on the substrate-layered structure are the same as those in the second method therefore the explanations for these steps are omitted. A feature of the third method is that the substrate-layered structure A is formed by placing the element support substrate 55 on the weight part support substrate 60, the substrate-layered structure B is formed by placing the stress sensing element substrate 40 on the substrate-layered structure A, adhesive is hardened, the element supporting part 43, the supporting part 53 and the weight part supporting part 63 are then broke off together, which is different from the second method. According to the third method, the element supporting part 43, the supporting part 53 and the weight part supporting part 63 all together are simultaneously broke off so that it is possible to improve the efficiency in manufacturing.

A fourth method for manufacturing the acceleration sensing unit according to an embodiment of the invention is now described.

Figure 12:
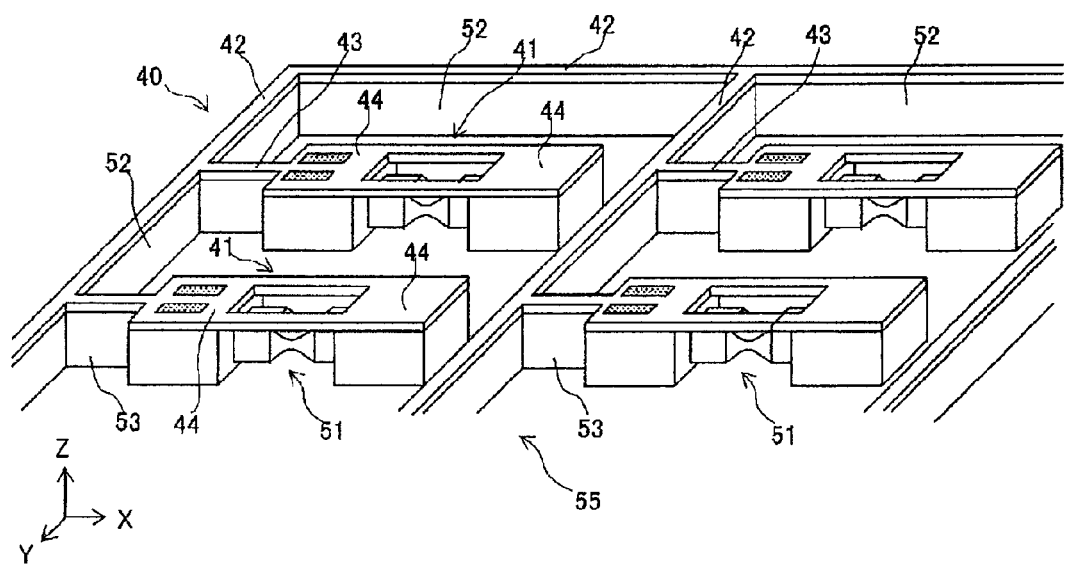
FIG. 12 illustrates a substrate-layered structure of the element support substrate, the weight part support substrate and the stress sensing element substrate.

The fourth method for manufacturing the acceleration sensing unit according to an embodiment includes a step of providing the element support substrate 55 that has a plurality of the element supporting members 51 and a step of providing the stress sensing element substrate 40 that has a plurality of the stress sensing elements 41'. Referring to FIG. 12, the element support substrate 55 includes the frame 52, a plurality of the supporting parts 53 formed on the frame 52, and the plurality of the element supporting members 51 each of which is individually supported by the respective supporting part 53. The stress sensing element substrate 40 includes the frame 42, a plurality of the element supporting parts 43 each of which is provided on the frame 42 so as to be situated at the same position as the corresponding supporting part 53 of the element support substrate 55, and the plurality of the stress sensing elements 41' each of which is individually supported by the corresponding element supporting part 43. The fourth method further includes a step of applying an adhesive onto the faces of each fixed part 5 and each movable part 20 in order to couple the fixed ends 44 of the stress sensing elements 41' with the fixed parts 5 and the movable parts 20 of the element supporting members 51 and a step of forming the substrate-layered structure by placing the element support substrate 50 on the stress sensing element substrate 40 such that each element supporting part 43 is situated at the position of the corresponding the supporting part 53. The fourth method further includes a step of hardening the adhesive in the substrate-layered structure and a step of breaking off the supporting parts 53 and the element supporting parts 43 from the substrate-layered structure which includes the element support substrate 55 and the stress sensing element substrate 40.

In the forth method for manufacturing the acceleration sensing unit, the grooves 54, 45 shown in FIG. 8B and FIG. 9B can also be provided in the element support substrate 55 and the stress sensing element substrate 40. Alternatively, these grooves may not be necessarily provided in the fourth method.

According to the fourth method for manufacturing the acceleration sensing unit, the weight part support substrate 60 is not necessary thereby there is an advantage that the manufacturing process is simplified and the cost reduction is possible.

Figure 13A:
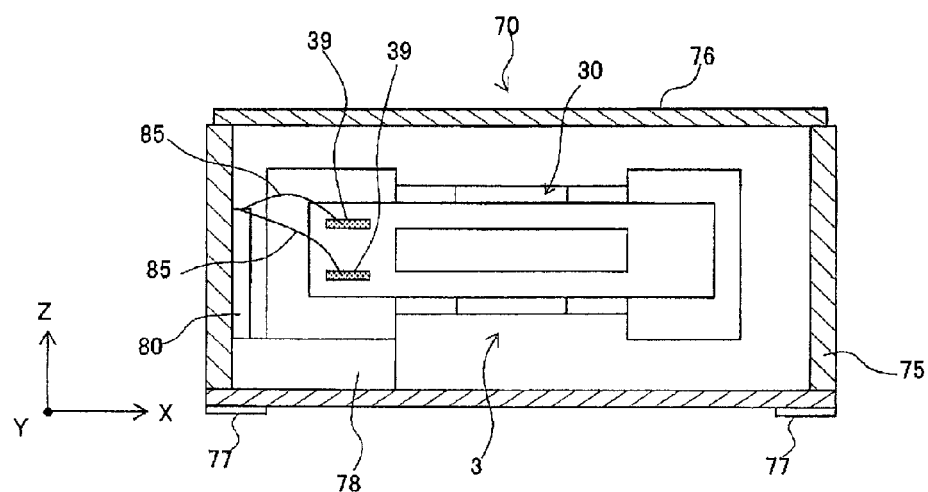
FIG. 13A is a side view of an acceleration sensor and FIG. 13B is a plan view of the acceleration sensor showing its structure.
Figure 13B:
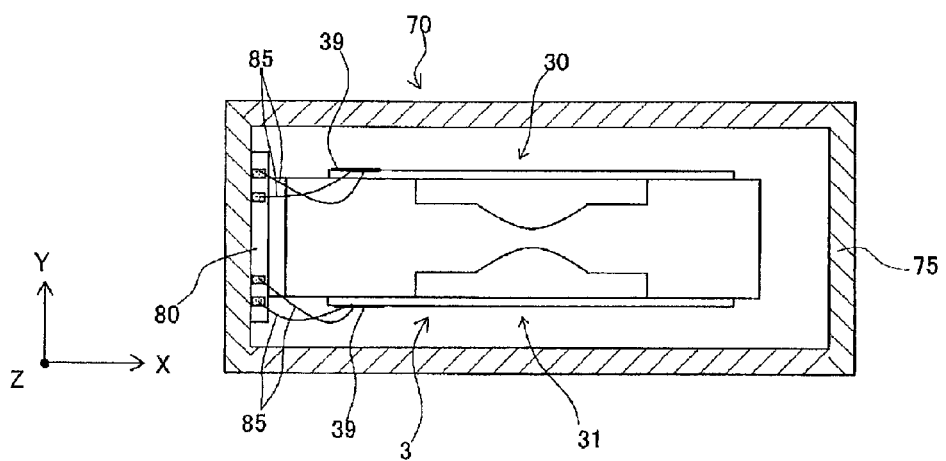
Figure 14:
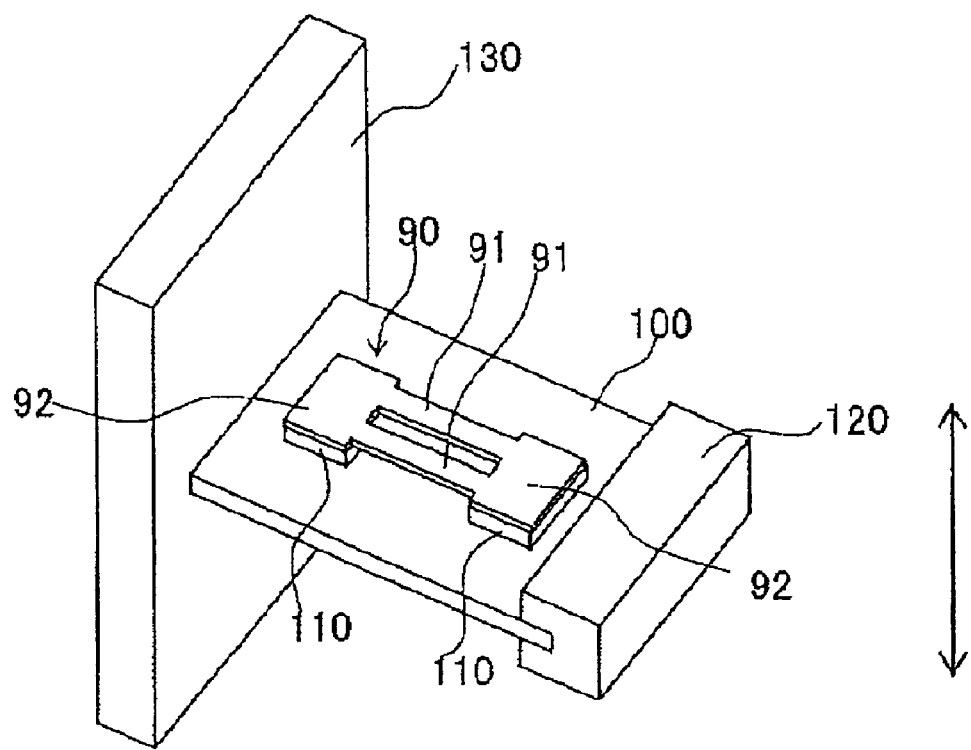
FIG. 14 shows a hitherto known acceleration sensor.

FIG. 13A is a side view of an acceleration sensor 70 and FIG. 13B is a plan view of the acceleration sensor 70 showing its structure. The acceleration sensor 70 includes for example the acceleration sensing unit 3, a housing (fixing part) 75, and an oscillation circuit 80 that is electrically coupled with the excitation electrodes in the stress sensing elements 30, 31. The acceleration sensing unit 3 shown in FIG. 13 is turned on its side from the one shown in FIG. 4. The acceleration sensing unit 3 is adhered and fixed to a mounting table 78. Electrode terminals 39 of the stress sensing elements 30, 31 are coupled to the oscillation circuit 80 through bonding-wires 85. An electrode terminal of the oscillation circuit 80 goes through the mounting table 78 and is electrically coupled with an external terminal 77 of the housing 75. A lid 76 is put on the housing 75 and the inside is air-tightly sealed.

According the methods for manufacturing the acceleration sensing unit described in the above embodiments, the stress sensing element, the element supporting member which holds the stress sensing element, and the weight part are made of the quartz crystal material and fabricated in a batch processing manner by using the photolithography technique and the etching technique. Therefore the methods have a fine mass productivity and a manufacturing cost can be reduced compared to a case where the element supporting member is made of a metal material. Moreover, the element supporting member, the stress sensing element and the weight part are not only made of the quartz crystal but also made from the substrates having the same cut angle according to the embodiments. Thereby the linear expansion coefficients of these three components become identical and it is possible minimize the heat strain among them caused by an ambient thermal fluctuation. The acceleration sensor according to the embodiment can detect a very subtle deformation of the beam (the fixed end) caused by a very small acceleration with the double-ended tuning-fork type quartz crystal resonator element, whereas the hitherto known silicon acceleration sensor can only detect the stress corresponding to several-micron order deformation. Therefore according to the embodiments there are advantages such as a quick response, a high accuracy and a fine reproducibility.

The manufacturing methods described above have been given by way of example only. The invention is obviously not limited to the specific embodiments described herein, but also encompasses any variations that may be considered by any person skilled in the art. For example the sequence of the steps can be adequately changed.

What is claimed is:

1. A method for manufacturing an acceleration sensing unit, comprising:
   a) providing an element support substrate in which a plurality of element supporting members is arranged so as to form a plane, each of the element supporting members being coupled to the other element supporting member through a supporting part and having a fixed part and a movable part that is supported by the fixed part through a beam, the beam having a flexibility with which the movable part is displaced along an acceleration detection axis direction when an acceleration is applied to the movable part;
   b) providing two stress sensing element substrates in which a plurality of stress sensing elements is arranged so as to form a plane, each of the stress sensing elements being coupled to the other stress sensing element through an element supporting part and having a stress sensing part and fixed ends that are formed so as to have a single body with the stress sensing part at both ends of the stress sensing part;
   c) disposing the element support substrate between the stress sensing element substrates such that the fixed ends of each stress sensing element are situated on the fixed part and the movable part;
   d) fixing the fixed ends onto the fixed part and the movable part, and
   e) dividing the element supporting part and the supporting part.

2. The method for manufacturing an acceleration sensing unit according to claim 1, wherein in the step c), the element supporting part and the supporting part are overlapped.

3. A method for manufacturing an acceleration sensing unit, comprising:
   a) providing an element support substrate in which a plurality of element supporting members is arranged so as to form a plane, each of the element supporting members being coupled to the other element supporting member through a supporting part and having a fixed part and a movable part that is supported by the fixed part through a beam, the beam having a flexibility with which the movable part is displaced along an acceleration detection axis direction when an acceleration is applied to the movable part;
   b) providing at least a single weight part support substrate in which a plurality of weight parts is arranged so as to form a plane, each of the weight parts being coupled to the other weight part through a weight-part supporting part;
   c) providing two stress sensing element substrates in which a plurality of stress sensing elements is arranged so as to form a plane, each of the stress sensing elements being coupled to the other stress sensing element through an element supporting part and having a stress sensing part and fixed ends that are formed so as to have a single body with the stress sensing part at both ends of the stress sensing part;
   d) forming a substrate-layered structure by disposing the weight part support substrate on the element support substrate in order to couple at least the weight part with the movable part;

e) dividing the weight-part supporting part;
f) disposing the substrate-layered structure between the stress sensing element substrates in order to couple the fixed ends of each stress sensing element with the substrate-layered structure; and
g) dividing the element supporting part and the supporting part.

4. A method for manufacturing an acceleration sensing unit, comprising:
  a) providing an element support substrate in which a plurality of element supporting members is arranged so as to form a plane, each of the element supporting members being coupled to the other element supporting member through a supporting part and having a fixed part and a movable part that is supported by the fixed part through a beam, the beam having a flexibility with which the movable part is displaced along an acceleration detection axis direction when an acceleration is applied to the movable part;
  b) providing two stress sensing element substrates in which a plurality of stress sensing elements is arranged so as to form a plane, each of the stress sensing elements being coupled to the other stress sensing element through an element supporting part and having a stress sensing part and fixed ends that are formed so as to have a single body with the stress sensing part at both ends of the stress sensing part;
  c) providing at least a single weight part support substrate in which a plurality of weight parts is arranged so as to form a plane, each of the weight parts being coupled to the other weight part through a weight-part supporting part;
  d) forming a substrate-layered structure by disposing the weight part support substrate on the element support substrate in order to couple at least the weight part with the movable part;
  e) disposing the substrate-layered structure between the stress sensing element substrates in order to couple the fixed ends of each stress sensing element with the substrate-layered structure; and
  f) dividing the supporting part, the weight-part supporting part and the element supporting part.

5. The method for manufacturing an acceleration sensing unit according to claim 3 further comprising: forming concave parts in the supporting part, the element supporting part and the weight-part supporting part.

6. The method for manufacturing an acceleration sensing unit according to claim 5, wherein the concave part provided in the supporting part is formed along a thickness direction of the stress sensing element substrate, and the concave parts provided in the element supporting part and the weight-part supporting part are formed so as to extend in a depth direction of the concave part provided in the supporting part.

* * * * *